United States Patent [19]

Jahnke

[11] Patent Number: 4,678,635

[45] Date of Patent: Jul. 7, 1987

[54] METALLIC JOINING MATERIAL

[75] Inventor: Bernd Jahnke, Neckargemuend, Fed. Rep. of Germany

[73] Assignee: Aktiengesellschaft Brown, Boveri & Cie, Baden, Switzerland

[21] Appl. No.: 810,312

[22] Filed: Dec. 17, 1985

[30] Foreign Application Priority Data

Dec. 20, 1984 [DE] Fed. Rep. of Germany ....... 3446479

[51] Int. Cl.⁴ .............................................. C22C 19/05
[52] U.S. Cl. .................................. 420/449; 420/443; 420/447; 420/448; 420/586
[58] Field of Search ........ 420/441, 442, 443, 445–450, 420/585, 586, 588; 148/428, 442

[56] References Cited

U.S. PATENT DOCUMENTS 2,936,229  5/1960  Shepard ............................. 420/441

*Primary Examiner*—R. Dean
*Attorney, Agent, or Firm*—Herbert L. Lerner; Laurence A. Greenberg

[57] ABSTRACT

A metallic joining material which is provided particularly for the joining of parts of oxide-dispersion-hardened alloys. The metallic joining material in particular is a solder which contains chromium, cobalt, boron, silicon, tungsten, molybdenum, tantalum, aluminum, titanium zirconium with the remainder nickel.

1 Claim, 1 Drawing Figure

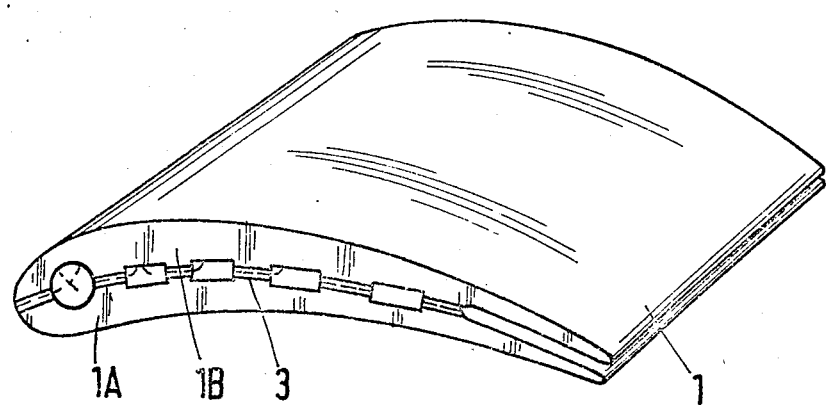

METALLIC JOINING MATERIAL

BACKGROUND OF THE INVENTION

1. Field of the Invention

The invention relates to a metallic joining material with components of nickel and chromium.

2. Description of the Prior Art

Such a metallic joining material finds application particularly for joining parts of oxide-precipitation-hardened alloys. Parts for forming rotor and stator blades as well as heat-retarding segments of gas turbines are preferably joined together with this joining material. Complex parts of oxide-precipitation-hardened alloys cannot be cast. They must be joined together from two or more parts to form a final part. Forming parts of oxide-precipitation-hardened alloys starts with the preparation of the powder forming the alloys. The metals and metal compounds which are employed in the preparation of the powders are mechanically alloyed in a high-energy mill. From the powder obtained in this manner, base bodies are first made by extrusion. The base bodies are subsequently processed further by forging, rolling and/or mechanical processing to form parts. The latter are then joined together by means of metallic joining materials, for instance, via a high-temperature soldering process to form rotor and guide blades or other parts, for instance, for gas turbines.

A metallic joining material, under the designation TD6, which consists substantially of 16% by weight chromium, 4% by weight silicon, 5% by weight tungsten and 17% by weight molybdenum and nickel, the remainder being nickel is known. Another joining material which is commercially available under the designation AMDRY 400, consists of 16.5% by weight nickel, 19% by weight chromium, 0.8% by weight boron, 8% by weight silicon and 4% by weight tungsten, the remainder being chromium. A third joining material with the designation AMDRY 788, contains 21% by weight nickel, 22% by weight chromium, 2% by weight boron, 2% by weight silicon, 14% by weight tungsten. The remainder consists of cobalt. These commercially available joining materials do not meet the requirements demanded of them. The high-temperature corrosion resistance required for turbine applications can be met only by an increased alloy content of equal to or more than 16% chromium as well as contents of Ti and aluminum. The aluminum required for the formation of an oxidation-resistant cover layer is present in none of the known solder alloys to a sufficient degree ($\geq 4\%$). Since high silicon contents result in increased danger of brittle phase formation on the basis of the known phase diagrams NiCrSi, such as the sigma phase and boron content of equal to or less than 2% lead to a heavy undesired incipient dissolution of the base material, the Si content should be limited to $\leq 4\%$ and the boron content to $\leq 2\%$. However, these concentrations should not be made substantially smaller because thereby, the melting point of the solder is set. The joining materials with too high a refractory content, especially too high a tungsten, molybdenum and tantalum content are frequently not compatible with protective layers.

SUMMARY OF THE INVENTION

It is, therefore, an object of the invention to provide a metallic joining material, especially a solder for parts of oxide-dispersion-hardened alloys, by which the latter can be joined durably so that they meet all the requirements occurring under operating conditions.

According to the invention a joining material for durably joining parts of alloys, especially oxide-dispersion-hardened alloys, is an admixture containing nickel, chromium, boron, silicon, aluminum, cobalt, tungsten, molybdenum, tantalum, titanium, zirconium or a rare earth metal.

With the foregoing and other objects in view, there is provided in accordance with the invention a metallic joining material suitable particularly for joining parts made of an ox-ide-dispersion-hardened alloy, said metallic joining material containing components of nickel and chromium, in admixture with at least portions of boron, silicon, aluminum, cobalt, tungsten, molybdenum, tantalum, titanium, zirconium or a rare earth metal.

Other features which are considered as characteristic for the invention are set forth in the appended claims.

Although the invention is illustrated and described herein as embodied in a metallic joining material, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a leaf formed by two blade halves which are soldered together by means of metallic joining material in accordance with the invention placed between the blade halves.

DESCRIPTION OF THE PREFERRED EMBODIMENTS

The joining material according to the invention exhibits strength characteristics which correspond to those which are exhibited by the parts to be joined together themselves under static and dynamic load. The joining zones formed with the solder according to the invention exhibit adequate oxidation and corrosion stability. The base materials of the parts joined together by the solder are not dissolved excessively or destroyed by the same. The diffusion stability of the joining zone formed by the use of the metallic joining material is assured at temperatures above 1,000° C.

With the solder according to the invention, larger components of oxide-precipitation-hardened alloys can be formed only from parts of such alloys or can be formed with the use of other parts which are cast of another superalloy.

A particularly good joint between parts of ox-ide-dispersion-hardened alloys with a nickel base is achieved by using a metallic joining material which contains, besides chromium silicon, nickel, boron and aluminum, additions of tantalum, cobalt and zirconium or lanthanum.

The best properties are exhibited by a metallic joining material which contains, in addition to nickel which forms the remainder, $\geq 16\%$ by weight chromium, 1 to 30% by weight cobalt, $\leq 1.5\%$ by weight boron, $\leq 4\%$ by weight silicon, $\leq 4\%$ by weight tungsten, molybdenum and tantalum, $\leq 1\%$ by weight iron, 0.1% by weight nitrogen, 0.05% by weight carbon, $\leq 0.4\%$ by weight oxygen, 5 to 9% aluminum, ≦1% by weight titanium and ≦0.5% by weight zirconium or ≦0.1% by weight lanthanum. The amounts by weight given are based on the total weight of the alloy.

The drawing shows a part 1 of the gas turbine which comes into contact with a hot gas. The part 1 is the leaf of a cooled gas turbine blade. It is formed by two blade halves which are forged from extruded blanks or are machined mechanically. An oxide dispersion-hardened alloy was used for fabricating the blade halves or elements 1A and 1B. The alloy consists of 13 to 17% by weight chromium, 2.5 to 6% by weight aluminum, 2 to 4.24% by weight titanium, 0.4 to 0.45% by weight molybdenum, 3.75 to 6.25% by weight tungsten, 0.1 to 0.3% by weight tantalum, 0.02 to 0.5% by weight zirconium, 0.01 to 0.02% by weight boron, 0.02 to 2% by weight yttrium as well as nickel. The weight amounts give are referred to the total weight of the alloy. The parts 1A and 1B fabricated in this manner are joined together, using the metallic joining material 3 according to the invention which is placed between the parts 1A and 1B which are subsequently soldered together. The metallic joining material used here contains 20% by weight chromium, between 1 and 30% by weight cobalt, 1.5% by weight boron, 4% by weight silicon, 4% by weight tungsten, molybdenum and tantalum, 1% by weight iron, 0.1% by weight nitrogen, 0.4% by weight oxygen, 0.015% by weight carbon, between 5 and 7% by weight aluminum, 1% by weight titanium and 0.5% by weight zirconium.

The foregoing is a description corresponding, in substance, to German application No. P 34 46 479.4, dated Dec. 20, 1984, international priority of which is being claimed for the instant application and which is hereby made part of this application. Any material discrepancies between the foregoing specification and the specification of the aforementioned corresponding German application are to be resolved in favor of the latter.

There is claimed:

1. Metallic joining material suitable particularly for joining parts made of an oxide-dispersion-hardened alloy, said metallic joining material consisting essentially of 20% by weight chromium, between 1 and 30 % by weight cobalt, 1.5% by weight boron, 4% by weight silicon, 4% by weight W or Mo or Ta, 1% by weight iron, 0.1% by weight nitrogen, 0.4% by weight oxygen, 0.015% by weight carbon, between 5 and 7% by weight aluminum, 1% by weight titanium, 0.5% by weight zirconium and nickel as the balance of the alloy.

* * * * *